UNITED STATES PATENT OFFICE.

JOHN H. LESTER, OF BROOKLYN, ASSIGNOR TO THE LESTER OIL MANUFACTURING COMPANY, OF NEW YORK, N. Y.

IMPROVED COMPOSITION OF MATTER FOR LUBRICATING MACHINERY AND FOR OTHER PURPOSES.

Specification forming part of Letters Patent No. 52,301, dated January 30, 1866; Reissue No. 2,422, dated December 18, 1866.

*To all whom it may concern:*

Be it known that I, JOHN H. LESTER, of Brooklyn, Kings county, in the State of New York, have invented a new and useful Composition of Matter for Lubricating Machinery and for other Purposes; and I do hereby declare that the following is a full, clear, and exact description thereof.

I have discovered that certain oleaginous secretions or matter obtained from the joints, feet, and other parts of animals, when mixed with animal and other oils or fluids, can be used to great advantage for lubricating machinery and other purposes. The said oleaginous secretions or matter I have successfully obtained in the following manner: I put a quantity of cattle-feet or other parts of animals in a clean caldron, with sufficient water to cover the said matter, and boil at a temperature of about 240° Fahrenheit until the flesh and gristle separate from the bone, which will require about four hours. The neat's-foot oil given out by the boiling will float on the surface, and may be skimmed off for separate use, if desired; but otherwise it may be left. I then prefer to remove the bones, as they are useful for many purposes in the arts. At this stage of the process the matter which I desire to mix with oil for lubricating and other purposes is in a suitable condition to receive the oil to be mixed with it. Whatever the matter in question may be, it is believed that it is either the synovial fluid known to anatomists, or that that fluid forms an important, if not the principal, part; and although the neat's-foot oil is not necessary to the compound which I desire to produce, its presence in the compound or preparation will not be injurious. When the matter is in the condition above described, and with or without the neat's-foot oil, I add about an equal quantity in bulk of paraffine-oil, which, by preference, should be first deodorized, and boil the mixture for about three-quarters of an hour, or until the paraffine combines with or takes up the matter above referred to, but not long enough to decompose the animal matter which is usually made into glue. After allowing the matter to stand about fifteen minutes to allow the heavier parts to settle, I draw off the liquid combination, so far as it can be done without disturbing the heavier matter not combined with the oil.

The compound thus produced of oil, with the matter with which it combines, constitutes my invention, chiefly intended for lubricating machinery, but which may be used for other purposes.

If it be desired to render the compound less fluid to prevent it from running freely, so that it can be used for lubricating vertical slides without waste, I add to the compound about from one-eighth to one-sixth, by measure, of whale or other animal or vegetable oil, and I have found that the best temperature at which to make such addition is about 70° Fahrenheit.

I have named paraffine as the oil to be used in making the said compound because it is the cheapest, and I have found it to be the best. I do not, however, limit myself to the use of paraffine, as other oils and fluids may be substituted. And as to the process hereinabove described for obtaining the fluid or matter to be combined with the oil and for effecting the combination or admixture, I do not limit myself to such process, as other and equivalent processes may be substituted.

What I claim as my invention, and desire to secure by Letters Patent, is—

The combination of oil with the synovial fluid or other substance obtained from animal matter, substantially as described.

JNO. H. LESTER.

Witnesses:

WM. H. BISHOP,

A. DELACY.